(No Model.) 2 Sheets—Sheet 2.
G. H. SMITH.
ADJUSTABLE FRICTION CLUTCH.
No. 521,677. Patented June 19, 1894.
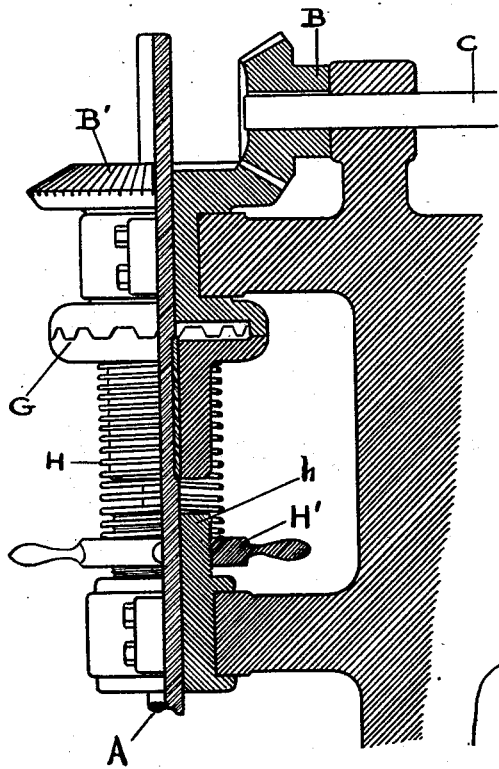
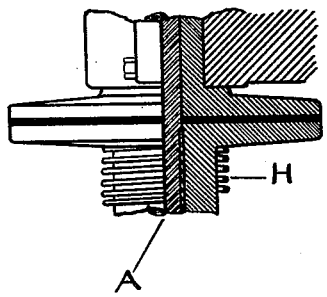
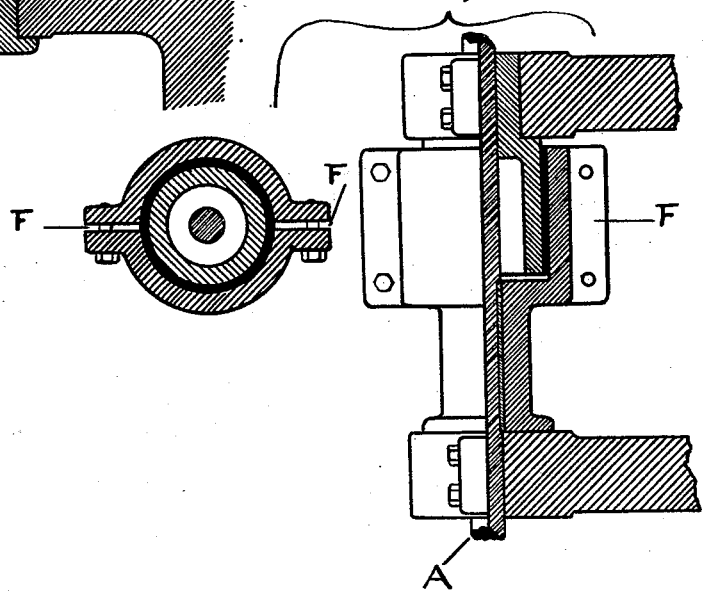
WITNESSES:
Jas. H. Pearce
John L. Snow
INVENTOR
Geo. H. Smith
BY
O. H. Indberg
ATTORNEY.

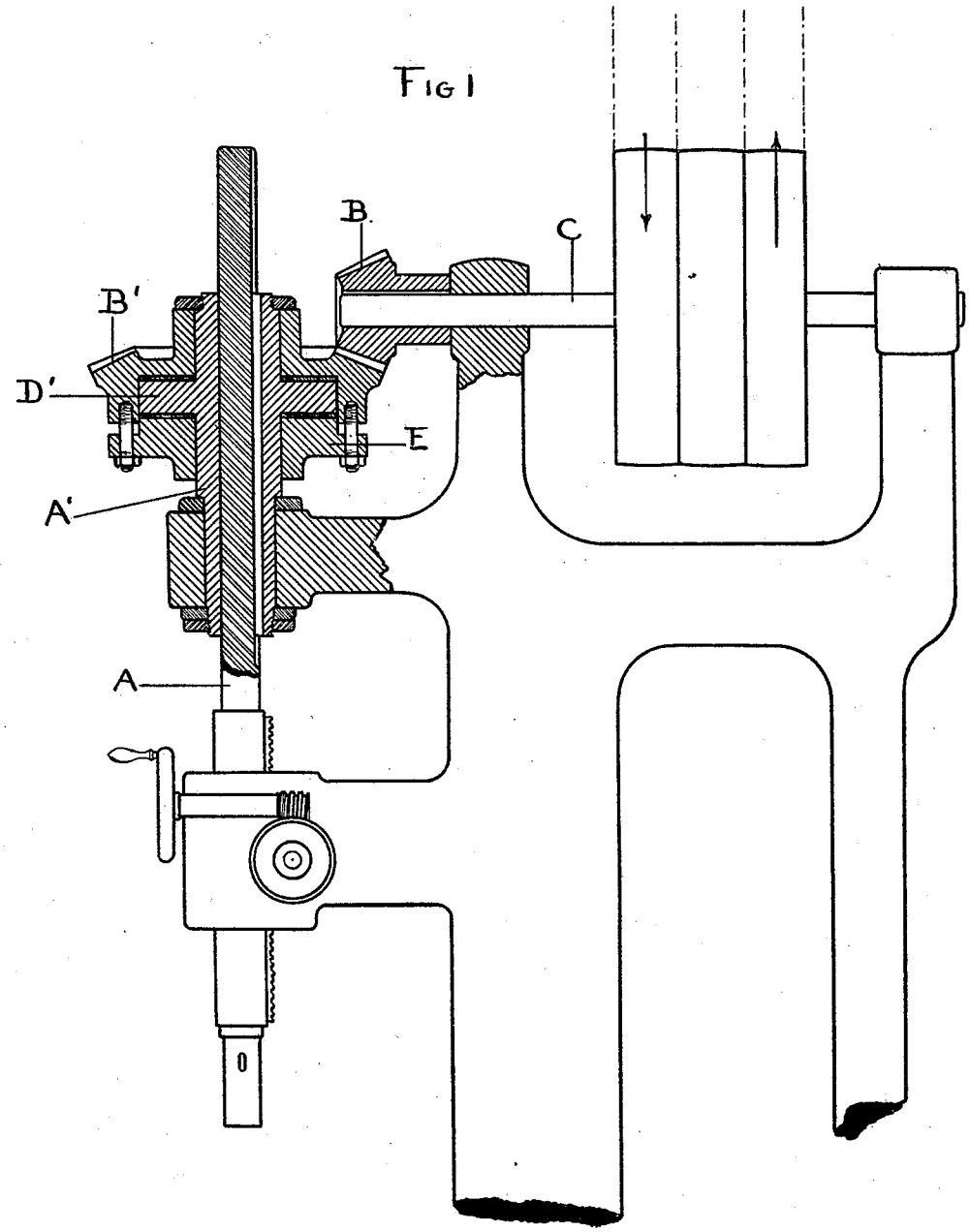

UNITED STATES PATENT OFFICE.

GEORGE HENRY SMITH, OF PROVIDENCE, RHODE ISLAND, ASSIGNOR OF ONE-HALF TO ELMER A. BEAMAN, OF SAME PLACE.

ADJUSTABLE FRICTION-CLUTCH.

SPECIFICATION forming part of Letters Patent No. 521,677, dated June 19, 1894.

Application filed October 17, 1892. Serial No. 449,071. (No model.)

*To all whom it may concern:*

Be it known that I, GEORGE HENRY SMITH, a citizen of the United States, residing at Providence, in the county of Providence and State of Rhode Island, have invented a certain new and useful Improvement in Adjustable Friction-Clutches; and I do hereby declare the following to be a full, clear, and exact description of the invention, such as will enable others skilled in the art to which it appertains to make and use the same.

My invention relates to drill presses, or similar machines, in which a revolving spindle is driven through intermediate gearing from a driving belt, and consists broadly in interposing between the driving pulley and the tool to be operated, a yielding frictional clutch capable of adjustment so that it will be operative by variable degrees of power. I preferably mount this clutch on the spindle of which it will form a part, but it is obvious that it may be placed in other positions in the machine so long as it is between the driving pulley and the tool to be operated.

In operating machines of this class for tapping or threading holes previously drilled, a failure to stop the machine when the tapping tool reaches the bottom of the hole will result in the breakage of the tool.

By applying my invention the clutch may be set to such a tension that the tool will receive power necessary to cut the thread and do the work, but an additional increase of resistance, such as would occur when the tool strikes the bottom of the drilled hole, results simply in the slipping of the clutch, and the machine may continue to revolve without injury to the tool. This of course will be true of other machines of a similar nature.

In the drawings I have illustrated in Figure 1 a sectional elevation of one form of my device; in Fig. 2 a similar view of a modified form, and in Figs. 3 and 4, views of alternative forms of Fig. 1.

Referring to the drawings,—in Fig. 1, A, represents a vertical tool spindle mounted as usual to slide in the interior of a sleeve A', mounted in a suitable bearing, the spindle receiving rotary motion through the agency of a spline or feather on the interior of the sleeve which slides in a way cut in the spindle. The spindle is fed down by a rack and worm gear, and rotated through the action of a beveled gear B', acted on by a pinion B, driven by a pulley mounted on a horizontal shaft, C. Ordinarily the beveled gear B' is made fast to the sleeve in which the driving spindle slides. Instead of mounting this gear in the usual manner, I mount it loosely upon the spindle and provide it with an annular recess on its under side in which a hub or collar D' projecting from a sleeve, is closely fitted. Below the hub or collar and attached to the gear by bolts running through a flange upon its edge, I mount an annular ring E, adapted to bear on the under side of the collar. Between the bearing surfaces above and below the collar, are interposed rings of fiber or vulcanite in order to increase the frictional resistance. It will be seen that the rotation of the spindle is dependent upon the frictional contact between the upper and lower surfaces of the hub or collar, and the lower surface of the gear and upper surface of the annular ring. The pressure between the points of contact may be readily increased by tightening the nuts upon the screws projecting through the flange formed on the annular ring.

In operation, the attendant of the machine, knowing the resistance of the tool which the spindle is driving, would set the clutch to a tension slightly more than that required to enable the tool to do its work. As a result of this adjustment, an increased resistance due to abnormal causes, would result in the stoppage of the tool and the slipping of the clutch.

It is obvious that the shape and construction of the friction surfaces may be varied, and that the means for producing pressure between the parts can be correspondingly changed.

In Fig. 4, is illustrated a second form in which the increase of tension is due to the tightening of the nuts holding the frictional surfaces together. In this case the spindle passes through the annular spline or sleeve as usual. This sleeve is enlarged at its upper end and split as shown at F—F, the two split portions being united by threaded bolts. Inside of the annular sleeve is an annular packing of vulcanite or fiber, and within this a second annular sleeve surrounding the spindle and adapted to be driven by the gear.

In Fig. 2 I have illustrated a modified form in which the pressure between the two members of the friction clutch is due to the tension of a spiral spring which may be adjusted by turning a hand wheel mounted on a projection from the lower bearing which carries the spindle. In this instance the hub of the bevel gear B', carries on its lower end a circular disk carrying downwardly projecting teeth with inclined faces. Beneath this, and mounted on a spindle, is a sleeve carrying a similar disk G, interlocking with the one above. This disk G, is pressed upward by a spiral spring H, surrounding the sleeve and resting in its lower end on an annular ring or hand wheel H, threaded in its interior and adapted to rotate on the hub $h$, projecting from the lower bearing in which the spindle works.

Fig. 3 illustrates a modified form of this device in which, while a spring pressure is used as in Fig. 2, the two members forming the clutch consist of flat disks between which is placed an annular disk of fiber.

The operation of the two forms is identical.

Having thus described my invention, what I claim is—

1. In a drill press, the combination with a longitudinally movable tool spindle, of a friction clutch surrounding the same, one member of the clutch rotating with the spindle, the other member adapted to drive the same, and means for varying the pressure between the two members, substantially as described.

2. In a drill press, the combination with a longitudinally movable tool spindle, and a key way carried thereby, of a sleeve surrounding the spindle, a key carried thereby and sliding in the key way, a bearing in which the sleeve is supported, a gear carried loosely upon the sleeve, and an adjustable frictional connection between the sleeve and the gear.

In testimony whereof I have affixed my signature in presence of two witnesses.

GEORGE HENRY SMITH.

Witnesses:
JAS. H. PEARCE,
JOHN L. SNOW.